United States Patent
Ikuta

(10) Patent No.: US 7,499,088 B2
(45) Date of Patent: Mar. 3, 2009

(54) IMAGING APPARATUS, IMAGING METHOD AND IMAGING PROCESSING PROGRAM

(75) Inventor: Satoshi Ikuta, Kanagawa (JP)

(73) Assignee: Sony Corporation, Tokyo (JP)

( * ) Notice: Subject to any disclaimer, the term of this patent is extended or adjusted under 35 U.S.C. 154(b) by 620 days.

(21) Appl. No.: 11/293,110

(22) Filed: Dec. 5, 2005

(65) Prior Publication Data

US 2006/0132627 A1    Jun. 22, 2006

(30) Foreign Application Priority Data

Dec. 6, 2004    (JP)    ............................. 2004-353123

(51) Int. Cl.
*H04N 9/64* (2006.01)
(52) U.S. Cl. .................... 348/251; 348/252
(58) Field of Classification Search ................ 348/251, 348/252, 335, 362, 363; 396/493, 497–501
See application file for complete search history.

(56) References Cited

U.S. PATENT DOCUMENTS 5,157,497 A * 10/1992  Topper et al. ............... 348/615
5,818,523 A * 10/1998  Ban .......................... 348/224.1
2002/0094131 A1 * 7/2002  Shirakawa .................. 382/274

FOREIGN PATENT DOCUMENTS

JP    2003-255424    9/2003

* cited by examiner

*Primary Examiner*—David L Ometz
*Assistant Examiner*—Akshay Trehan
(74) *Attorney, Agent, or Firm*—Finnegan, Henderson, Farabow, Garrett & Dunner, L.L.P.

(57) ABSTRACT

An imaging apparatus is provided in which a picked-up image having no light-amount unevenness with respect to an arbitrary shutter speed is obtained in the case where the center of the brightness is deviated in accordance with the shutter speed. The imaging apparatus includes a shading correction center-position correction-function unit 11 which changes the center position of the shading correction by a shading correction unit 6 in accordance with the shutter speed of a mechanical shutter 2' that switches the exposure timing of the imaging by a CCD 3 or in accordance with the zoom position of a lens.

12 Claims, 6 Drawing Sheets

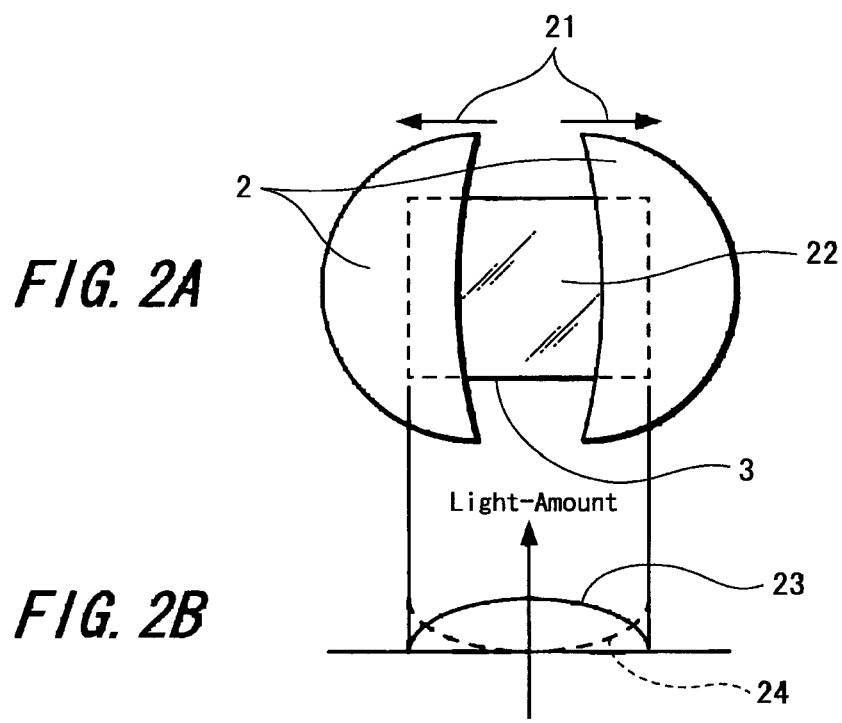
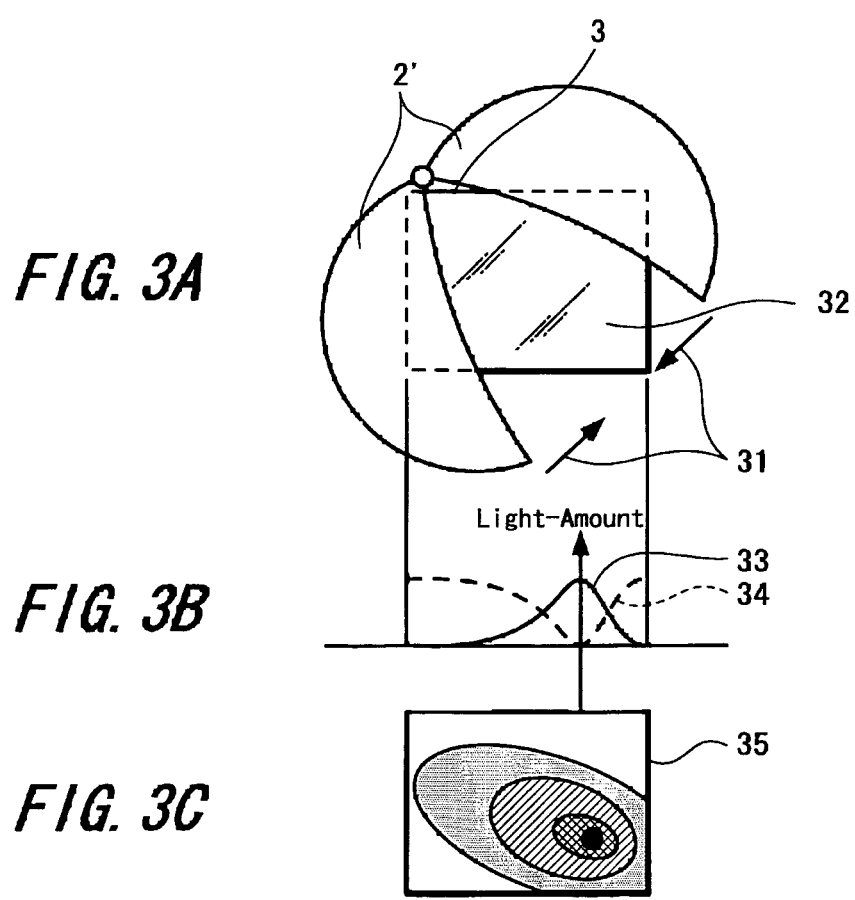

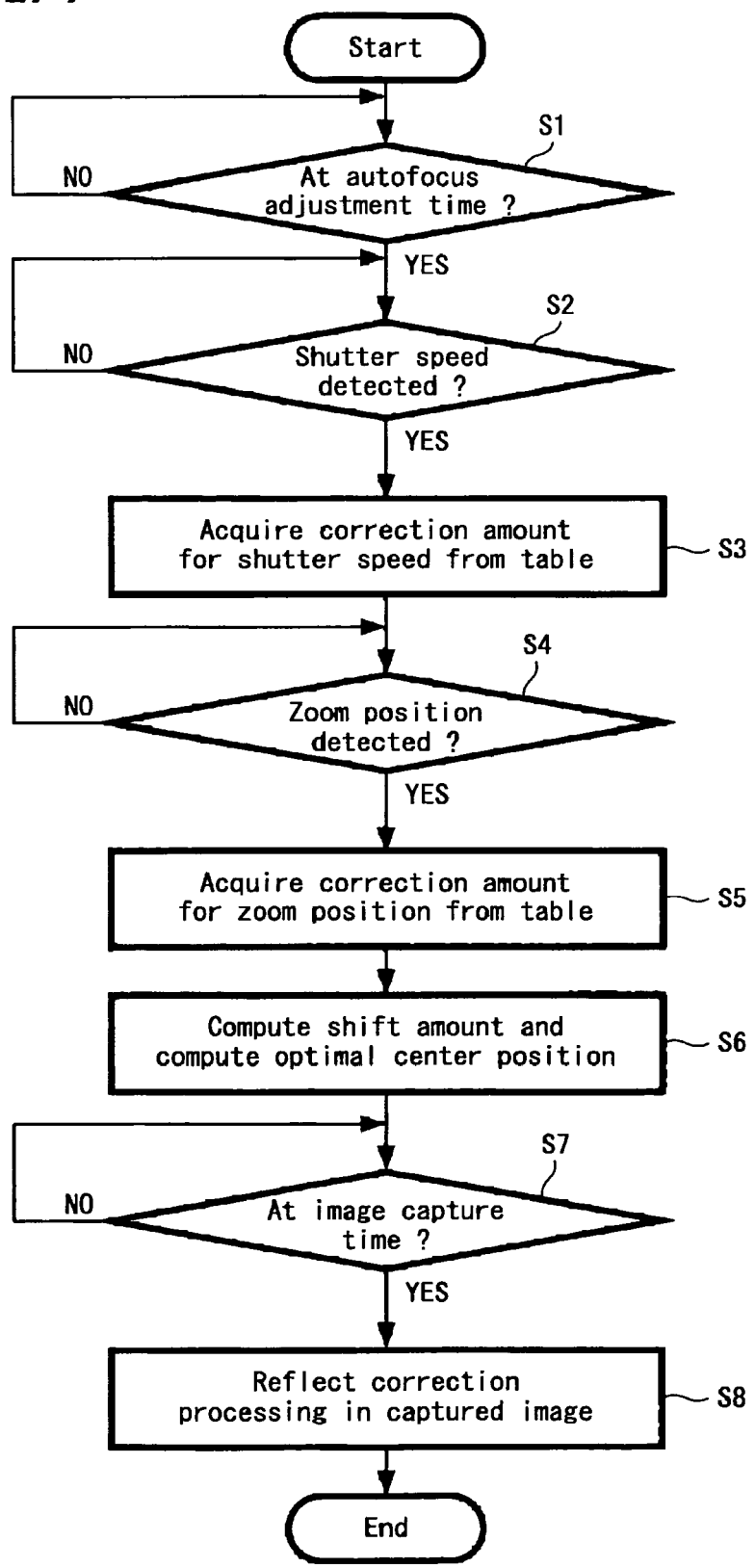

IMAGING APPARATUS, IMAGING METHOD AND IMAGING PROCESSING PROGRAM

CROSS REFERENCES TO RELATED APPLICATIONS

The present invention contains subject matter related to Japanese Patent Application JP 2004-353123 filed in the Japanese Patent Office on Dec. 6, 2004, the entire contents of which being incorporated herein by reference.

BACKGROUND OF THE INVENTION

1. Field of the Invention

The present invention relates to an imaging apparatus, an imaging method and a program for imaging processing, for performing shading correction not to decrease the amount of light of the outer edge in an image to be picked up.

2. Description of the Related Art

Typically, brightness unevenness may occur in an image captured due to characteristics of an image pickup element of a lens and the like, in an imaging apparatus used for a TV camera, a video camera and so on. Thus, shading correction that corrects an image by multiplying each position of a picked-up image by a correction coefficient is performed. Since the brightness unevennesses of the picked-up image occurs as concentric circles in the direction toward the outside from the center of the image, the correction has been performed in the past by multiplying the concentric circles by the correction coefficients with a central portion of the image being centered.

Further, in the case in which correction of the image quality deterioration due to color aberration or the like is performed by enlarging or reducing the image for each color, an imaging apparatus that simultaneously performs camera shake correction has been proposed (refer to Patent Document 1, for example).

Patent Document 1: Published Japanese Patent Application No. 2003-255424

SUMMARY OF THE INVENTION

However, as for the brightness unevenness caused by the shape of a shutter and the closing mechanism thereof, depending on the shape and mechanism, there may be a case in which a position of the center of distribution of brightness unevenness is different from the center of the image and a case in which a position of the center used for correction is different depending on the shutter speed. In those cases, there is an inconvenience that appropriate correction may not be performed by the method of the past.

Hence, the present invention addresses the above-identified and other problems associated with conventional methods and apparatuses, and provides an imaging apparatus, an imaging method and a program for imaging processing, in which an image can be picked up without the light-amount unevenness with respect to an arbitrary shutter speed in the case in which the center of the brightness deviates in accordance with the shutter speed.

An imaging apparatus according to an embodiment of the present invention includes a center position correction unit which changes a center position of shading correction by a shading correction unit in accordance with the shutter speed of a shutter which switches the exposure timing of the imaging by an imaging unit.

According to the above, correction of the light-amount unevenness can be performed by changing the center position of the shading correction in the case in which the center of brightness deviates in accordance with the shutter speed when the shading correction in which the amount of light decreases toward the outer edge from the center of the image is applied.

Further, an imaging method according to an embodiment of the present invention includes the steps of: executing computation to make a center position of shading correction change at the time of autofocus of an optical system in accordance with the shutter speed of a shutter which switches the exposure timing of the imaging, and correcting a center position of an image at the time of capturing the image based on the amount of correction obtained by the computation.

According to the above, the computation of the amount of correction in which the center position of the shading correction is changed can be performed in accordance with the shutter speed by using the exposure data obtained at the time of the autofocus and further the change of the center position of the shading correction in accordance with the shutter speed is reflected in the captured image by correcting the center position of the image based on the amount of correction at the time of capturing the image.

Further, a program for imaging processing according to an embodiment of the present invention is the program to obtain the functions of: giving instructions to execute computation by which a center position of the shading correction is changed at the time of autofocus of the optical system in accordance with the shutter speed of a shutter which switches the exposure timing of the imaging and giving instructions to correct a center position of an image at the time of capturing the image picked up based on the amount of correction obtained by the computation.

According to an embodiment of the program of the present invention, the computation-instructing function that performs the computation of the amount of correction in which the center position of the shading correction is changed in accordance with the shutter speed can be obtained by using the exposure data obtained at the time of autofocus, and the correction-instructing function that reflects in the captured image the change of the center position of the shading correction in accordance with the shutter speed by correcting the center position of the image based on the amount of correction at the time of capturing the image.

According to the embodiments of the present invention, an image picked-up without the light-amount unevenness with respect to an arbitrary shutter speed can be obtained by correcting the light-amount unevenness in the case in which the center of brightness deviates in accordance with the shutter speed by changing the center position of the shading correction, and so the quality of the picked-up image can be improved.

Further, according to the above, the correction can be applied efficiently to the brightness unevenness caused by the change of the position of the center depending on photographing (shooting) conditions. Moreover, there is an advantage that it is not necessary to newly build a complicated correction circuit, because a shading correction unit of the past can also be used.

BRIEF DESCRIPTION OF THE DRAWINGS

FIGS. 2A and 2B are diagrams showing shading correction characteristics in accordance with the light-amount characteristics by a mechanical shutter, in which FIG. 2A shows an opening and closing operation of the mechanical shutter and FIG. 2B shows the light-amount characteristics and the shading correction characteristics;

FIGS. 3A to 3C are diagrams showing the shading correction characteristics in accordance with the light-amount characteristics by a mechanical shutter used for an embodiment of the present invention, in which FIG. 3A shows the opening and closing operation of the mechanical shutter, FIG. 3B shows the light-amount characteristics and the shading correction characteristics and FIG. 3C shows the light-amount distribution characteristics;

FIGS. 5A and 5B are diagrams showing the shift amount with respect to the shutter speed at the time of the zoom position a, in which FIG. 5A shows the shift amount in the X direction and FIG. 5B shows the shift amount in the Y direction;

FIGS. 6A and 6B are diagrams showing the shift amount with respect to the zoom position at the time of the shutter speed s, in which FIG. 6A shows the shift amount in the X direction, and FIG. 6B shows the shift amount in the Y direction;

FIG. 7 is a flow chart showing an operation of the center position correction of the shading correction.

DESCRIPTION OF THE PREFERRED EMBODIMENTS

Figure 1:
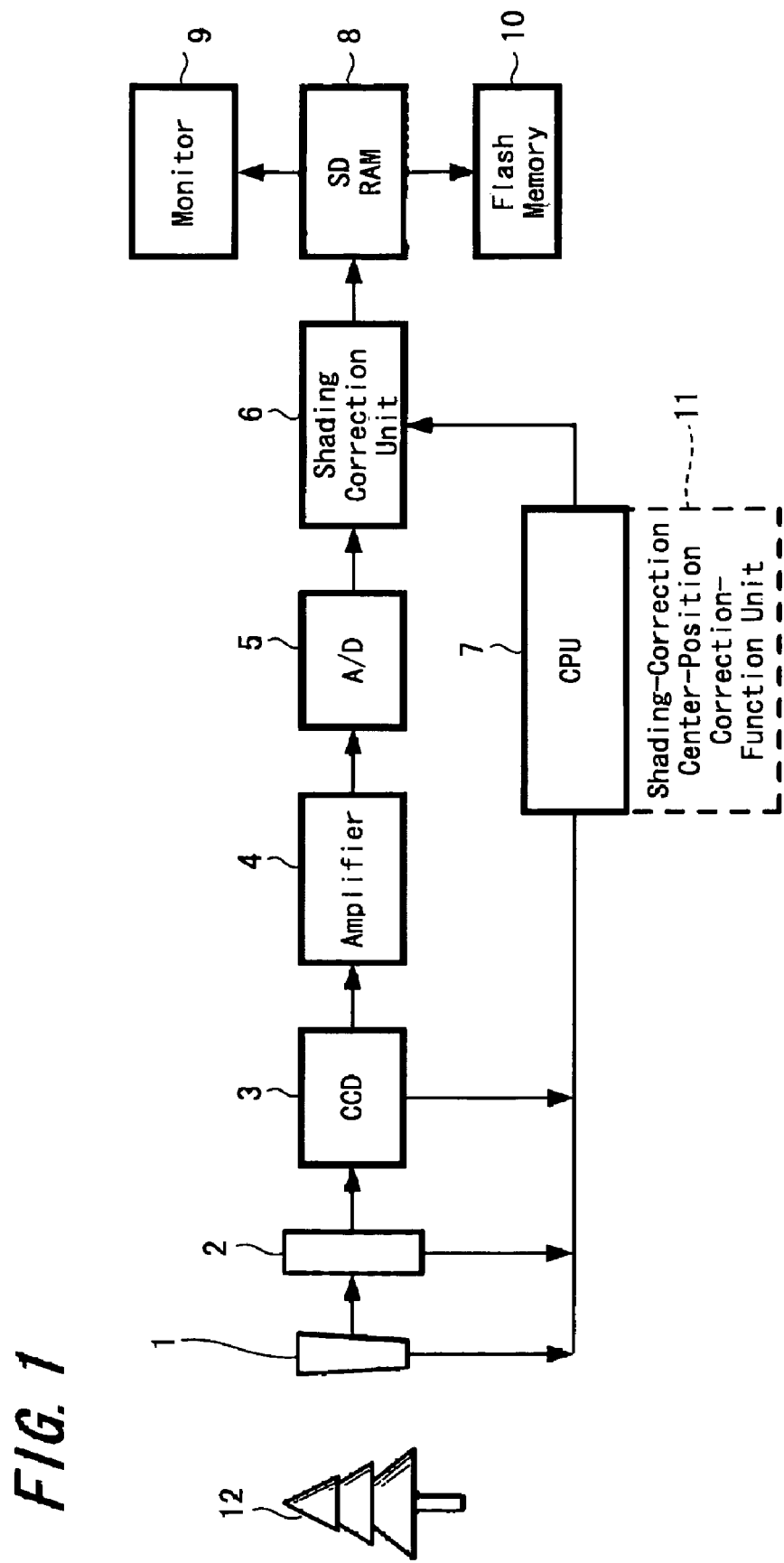
FIG. 1 is a block diagram showing a configuration of an imaging apparatus according to an embodiment of the present invention.

Hereinafter, an embodiment of the present invention will be explained referring to the drawings.

FIG. 1 is a block diagram showing a configuration of an imaging apparatus according to an embodiment of the present invention.

In an imaging apparatus shown in FIG. 1, an image signal of a subject 12 is captured in a CCD (Charged Couple Device) 3 through a lens 1 to be stored in a SDRAM (Synchronous Dynamic Random Access Memory) 8 after predetermined processing is performed and then is output as a video signal to a monitor 9 and a flash memory 10. Predetermined optical conversion such as focusing adjustment and zooming adjustment are performed by the lens 1 on the incident light from the subject 12. The reflected light of the subject 12 optically converted at the lens 1 is focused to be an image on the CCD 3 through a mechanical shutter 2'. The CCD 3 outputs the entering light reflected from the subject 12 as the image signal.

The imaging apparatus includes an amplifier 4 that amplifies the image signal obtained from the CCD 3 so that the signal processing after that becomes possible, an A/D converter 5 that converts the image signal supplied from the amplifier 4 into the digital signal from the analogue signal and a shading correction unit 6 that corrects the shading of the image signal by performing brightness correction processing on the image signal converted into a digital signal by the A/D converter 5.

FIGS. 2A and 2B show the shading correction characteristics in accordance with the light-amount characteristics by a mechanical shutter 2 of related art to be compared with a mechanical shutter 2' used for an embodiment of the present invention described later on.

In FIGS. 2A and 2B, since the mechanical shutter 2 is operated to open and close in the opening and closing direction 21 corresponding to the long side direction of the CCD 3, the light-amount of the reflected light of subject 12 entering a CCD imaging surface 22 of the CCD 3 decreases at the peripheral portion of the lens 1 and at the outer edge portion in the opening and closing direction 21 of the mechanical shutter 2 on the imaging surface 22 of CCD 3, as shown in the light-amount characteristics 23.

The shading correction unit 6 shown in FIG. 1 is provided to correct the decrease of light-amount in the peripheral portion of the lens 1 as shown in FIGS. 2A and 2B and has gain characteristics such as shading correction characteristics 24, in the shape of the concentric circle, of reverse characteristics to the light-amount characteristics 23 with a central portion of the picked-up image being centered, and operates to multiply the captured image data by the gain characteristics.

FIGS. 3A to 3C are diagrams to explain the light-amount characteristics of a mechanical shutter 2' used for the embodiment of the present invention and to explain the shading correction corresponding thereto.

FIGS. 3A to 3C show an example of a configuration of the mechanical shutter 2' used for the embodiments of the invention. That is, in the case in which the mechanical shutter 2' having such shape as shown in FIG. 3A is used due to the miniaturization of the lens, the mechanical shutter 2' is operated to open and close in the opening and closing direction 31 corresponding to the diagonal direction of the CCD 3. Accordingly, the light-amount of the reflected light from subject entering a CCD imaging surface 32 of the CCD 3 decreases at the peripheral portion of the lens 1 in the CCD imaging surface 32 and at the outer edge portion in the opening and closing direction 31 of the mechanical shutter 2', as shown in light-amount characteristics 33, and further, the center of the light-amount characteristics 33 deviates from the center of the CCD imaging surface 32 in the diagonal direction vertically corresponding to the opening and closing direction 31.

Therefore, at the position deviated from the center of the image on the CCD imaging surface 32 in the diagonal direction vertically corresponding to the opening and closing direction 31, since the exposure time becomes longest, the light-amount increases and on the contrary, at the portion covered with the mechanical shutter 2' early in the opening and closing direction 31, since the exposure time becomes short, the light-amount decreases. The shutter speed of the mechanical shutter 2' becomes faster, this phenomenon appears more conspicuously, and further, it is known by means of the measurement that the shape of distribution of the light-amount unevenness becomes different depending on the shutter speed.

Hence, the shading correction unit 6 is required to have such shading characteristics 34 as shown in FIG. 3B in the case in which the above mechanical shutter 2' is used. That is, the decrease of the light-amount at the peripheral portion of the lens 1 and at the outer edge portion in the opening and closing direction 31 of the mechanical shutter 2' is considered, and further, it is necessary to correct the center of the light-amount characteristics 33 deviated from the center of the CCD imaging surface 32 in the diagonal direction vertically corresponding to the opening and closing direction 31. Hence, with the center of the light-amount characteristics 33 deviated in the diagonal direction vertically corresponding to the opening and closing direction 31 from the center of CCD imaging surface 32 that is the center of the image picked-up being centered, the shading correction characteristics 34 reverse to the light-amount characteristics 33 are given in the shape of concentric circles. Further, the shading correction of the picked-up image is performed by multiplying the obtained image data by the gain characteristics corresponding to the shading characteristics 34. Here, light-amount characteristics 33 shown in FIG. 3B are shown in the plan view of FIG. 3C as light-amount distribution characteristics 35.

In addition, in the imaging apparatus shown in FIG. 1, a CPU 7 includes a shading-correction center-position correction-function unit 11 that changes the center position of the shading correction by the shading correction unit 6 depending on the shutter speed of the mechanical shutter 2' which switches the exposure timing of the imaging by the CCD 3.

Figure 4:
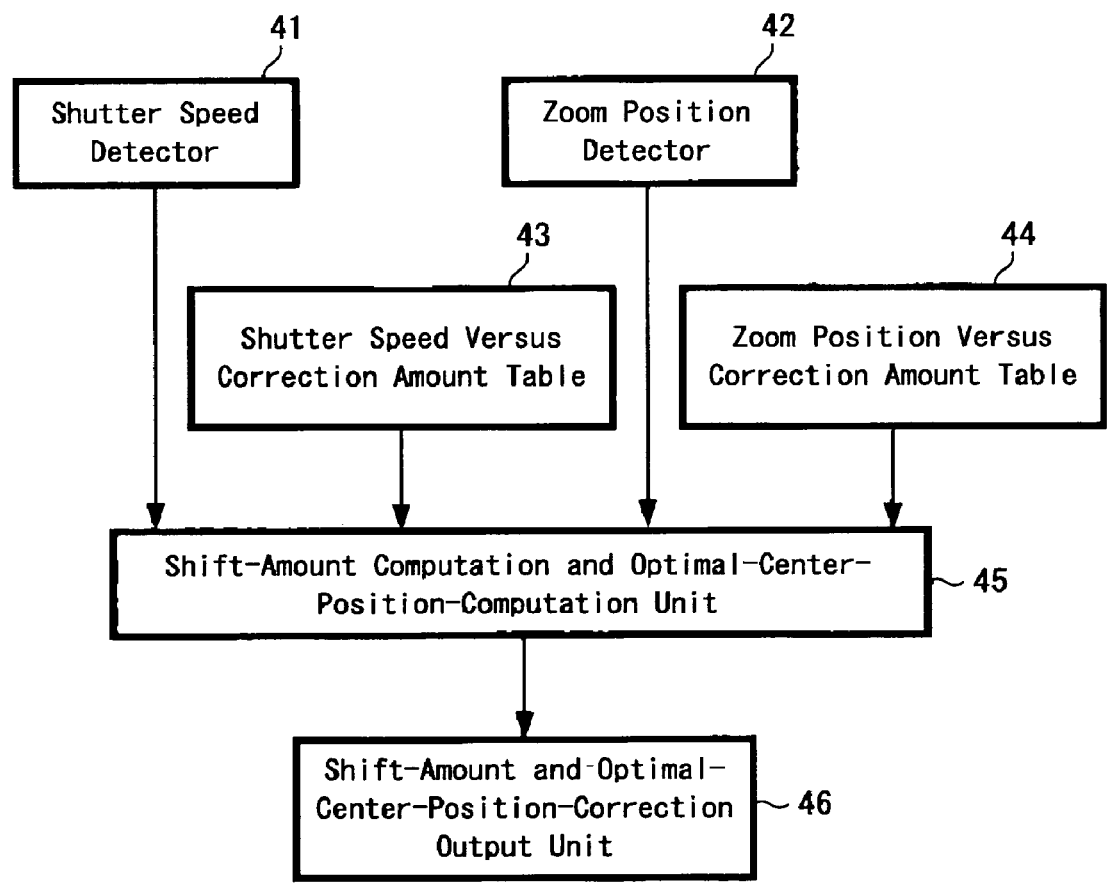
FIG. 4 is a block diagram showing a center position correction function of the shading correction.

FIG. 4 is a block diagram showing the whole of the function of the shading-correction center-position correction-function unit 11 in the CPU 7.

The shading-correction center-position correction-function unit 11 includes a shutter speed detector 41 that detects the shutter speed of the mechanical shutter 2' (exposure time) and a zoom position detector 42 that detects a zoom position of the lens 1.

Further, the shading-correction center-position correction-function unit 11 includes a shift-amount-computation and optimal-center-position-computation unit 45, where the shift amount is computed so that the optimal center position of the shading correction by the shading correction unit 6 is changed in accordance with the shutter speed of the mechanical shutter 2' that switches the exposure timing of the imaging by the CCD 3, and further the shift amount is computed so that the optimal center position of the shading correction by the shading correction unit 6 is changed in accordance with the zoom position where the position of the zoom lens of the optical system is switched.

Furthermore, the shading-correction center-position correction-function unit 11 includes a shutter speed versus correction amount table 43 in which the shutter speed is measured in advance and the amount of correction at the center position of the shading correction with respect to an arbitrary shutter speed is computed and stored. The correction amount table 43 is provided for each zoom position where the position of a zoom lens of the optical system is switched.

Furthermore, the shading-correction center-position correction-function unit 11 includes a zoom position versus correction amount table 44 in which the zoom position is measured in advance and the amount of correction at the center position of the shading correction with respect to an arbitrary zoom position is computed and stored. The correction amount table 44 is provided for each shutter speed.

Moreover, the shading-correction center-position correction-function unit 11 includes a shift-amount and optimal-center-position-correction output unit 46 that outputs the shift amount and optimal center position computed by a shift-amount-computation and optimal-center-position-computation unit 45 to the shading correction portion 6.

Hereinafter, the function of computing the shift amount of the shading-correction center-position correction-function unit 11 configured as described above is explained.

Figure 5B:
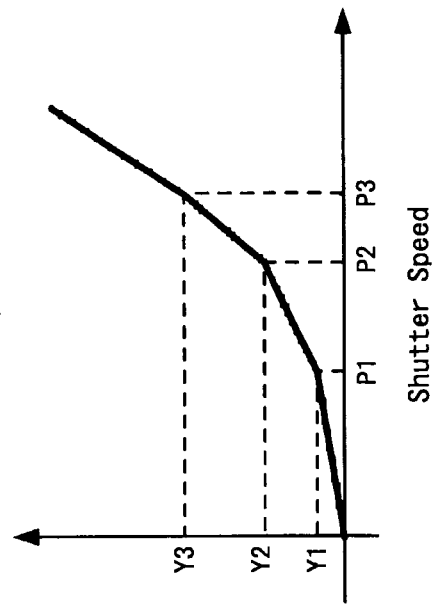
Figure 5A:
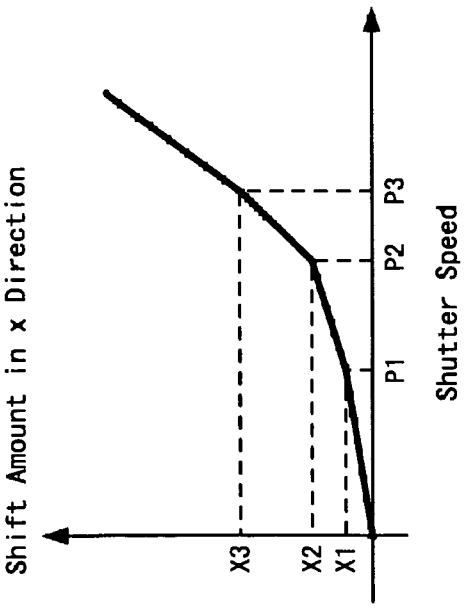

FIGS. 5A and 5B are diagrams showing the shift amount with respect to the shutter speed at the time of the zoom position a, and FIG. 5A shows the shift amount in the X direction, and FIG. 5B shows the shift amount in the Y direction.

FIGS. 5A and 5B are graphs prepared for the correction by computing the shift amount after measuring the shutter speed in advance. The graphs are prepared for each zoom position, which represent the relations between the shift amounts X1, X2 and X3 in the X direction and the shutter speeds P1, P2 and P3 shown in FIG. 5A and the relations between the shift amounts Y1, Y2 and Y3 in the Y direction and the shutter speeds P1, P2 and P3 shown in FIG. 5B, in each zoom position a, b, c . . . .

For example, the data of the shift amounts X1, X2 and X3 in the X direction for each shutter speed P1, P2, P3, shown in FIG. 5A and the data of the shift amounts Y1, Y2 and Y3 in the Y direction for each shutter speed P1, P2, P3, shown in FIG. 5B are stored in the shutter speed versus correction amount table 43 in FIG. 4. The shift-amount-computation and optimal-center-position-computation unit 45 shown in FIG. 4 obtains the graphs for the correction shown in FIGS. 5A and 5B by interpolating the data on the shift amount with respect to the shutter speed between each shutter speed P1, P2, P3 based on the data stored in the shutter speed versus correction amount table 43.

Figure 6B:
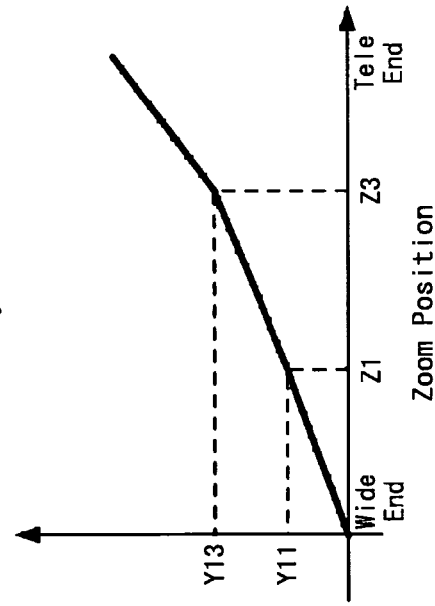
Figure 6A:
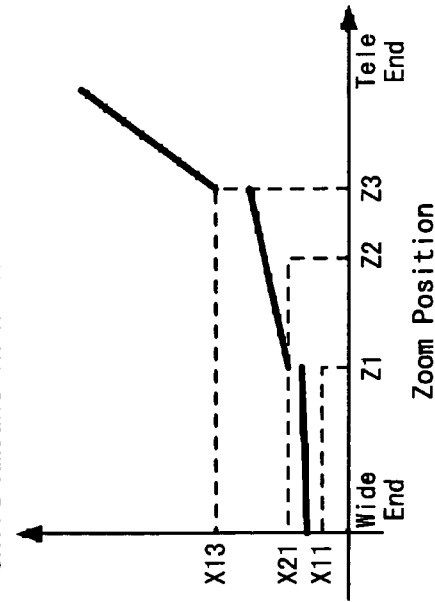

FIGS. 6A and 6B are diagrams showing the shift amount with respect to the zoom position at the time of the shutter speed s, and FIG. 6A shows the shift amount in the X direction, and FIG. 6B shows the shift amount in the Y direction.

FIGS. 6A and 6B are graphs prepared for the correction by computing the shift amount after measuring the zoom position in advance. The graphs are prepared for each shutter speed, which represent the relations between the shift amounts X11, X12 and X13 in the X direction and the zoom position Z1 (wide end side), Z2 and Z3 (tele end side) shown in FIG. 6A and the relations between the shift amounts Y11 and Y13 in the Y direction and the zoom positions Z1 (wide end side), Z2 and Z3 (tele end side) shown in FIG. 6B, in each shutter speed s, t, u . . . .

For example, the data of the shift amounts X11, X12 and X13 in the X direction for each zoom position z1 (wide end side), z2, z3 (tele end side) in FIG. 6A and the data of the shift amounts Y11 and Y13 in the Y direction for each zoom position Z1 (wide end side), Z3 (tele end side) shown in FIG. 6B are stored in the zoom position versus correction amount table 44 shown in FIG. 4. The shift-amount-computation and optimal-center-position-computation unit 45 shown in FIG. 4 obtains the graphs for the correction shown in FIGS. 6A and 6B by interpolating the data of the shift amount with respect to zoom positions between the zoom positions Z1 (wide end side), Z2, Z3 (tele end side) based on the data stored in the zoom position versus correction amount table 44.

Figure 8:
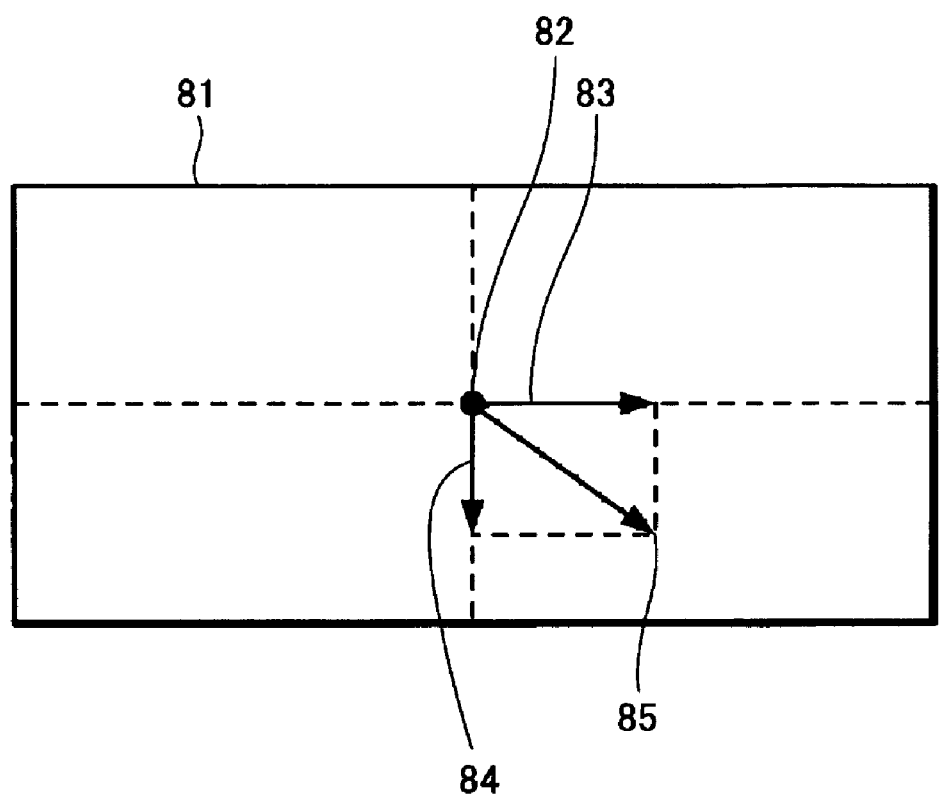
FIG. 8 is a diagram showing the center position correction of the shading correction.

Based on the shutter speed and zoom position measured by the shutter speed detector 41 and the zoom position detector 42 shown in FIG. 4, as shown in FIG. 8, the shift-amount-computation and optimal-center-position-computation unit 45 shown in FIG. 4 computes the shift amount 83 in the X direction and the shift amount 84 in the Y direction from the center of the image 82 by using those graphs, and computes the center position 85 of the optimal correction of the concentric circles for the shading correction. The computed shift data is notified to the shading correction unit 6, and after changing the position of the center in accordance with the shift amount, the shading correction unit 6 performs more suitable correction by multiplying the image by the gain in the shape of the concentric circles.

FIG. 7 is a flow chart showing an operation of the center position correction of the shading correction, and shows each processing that relates to the computation of the shift amount by the shading-correction center-position correction-function unit 11 shown in FIG. 4.

In FIG. 7, first, the CPU 7 judges whether or not it is at the autofocus (AF) adjustment time with respect to the lens 1 (step S1).

By the judgment in the step S1, if it is the auto-focus (AF) adjustment time, the shutter speed detector 41 in the shading-correction center-position correction-function unit 11 judges whether or not the shutter speed of the mechanical shutter 2' was detected (step S2).

By the judgment in the step S2, if the shutter speed was detected, the shift-amount-computation and optimal-center-position-computation unit 45 shown in FIG. 4 reads and captures the correction amount for the shutter speed from the shutter speed versus correction amount table 43 (step S3)

Next, in the zoom position detector 42 of the shading-correction center-position correction-function unit 11, it is judged whether or not the zoom position of the lens was detected (step S4).

By the judgment in the step S4, if it is judged that the zoom position was detected, the shift-amount-computation and optimal-center-position-computation unit 45 reads and captures the correction amount for the zoom position from the zoom position versus correction amount table 44 (step S5).

Further, the shift-amount-computation and optimal-center-position-computation unit 45 computes the shift amount based on the correction amount for the shutter speed and the correction amount for the zoom position, and computes the optimal center position (step S6).

At this time, the image on which the shading correction is not performed by the shading correction unit 6 is still being outputted to the monitor shown in FIG. 1.

Next, the CPU 7 judges whether or not the image was captured by the CCD 3, in other words, judges whether or not it is the image capture time (step S7).

By the judgment in the step S7, if it is judged to be the image capture time, the shift-amount and optimal-center-position-correction output unit 46 outputs the shift amount and optimal center position computed by the shift-amount-computation and optimal-center-position-computation unit 45 to the shading correction unit 6.

With this, the shading correction unit 6 reflects in the captured image the change of the center position of the shading correction in accordance with the shutter speed and zoom position, by correcting the center position of the image based on the correction amount at the capture time of the image (step 8).

The captured image in which the change of the center position of the shading correction in accordance with the shutter speed and zoom position is reflected is stored in the flash memory 10 shown in FIG. 1.

Though an embodiment according to the present invention was explained hereinbefore, the present invention is not limited to the embodiment described above. For example, in the imaging apparatus described above, in the case in which the brightness unevenness of the image generated when a flash is illuminated is corrected by the shading correction, the brightest position is different depending on the distance or image angle of the subject. Therefore, by computing the position of the subject and changing the center position of correction based on that, the shading correction to the brightness unevenness of the image on the flash illumination can also be performed.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    an imaging unit which picks up an image of a subject through an optical system;
    a shading correction unit which performs correction not to decrease the amount of light of the outer edge in the image of the subject picked up by said imaging unit; and
    a center position correction unit which changes a center position of the shading correction by said shading correction unit in accordance with the shutter speed of a shutter which switches the exposure timing of the imaging by said imaging unit.

2. The imaging apparatus according to claim 1,
    wherein, said center position correction unit further changes the center position of the shading correction by said shading correction unit in accordance with the zoom position where the position of a zoom lens of said optical system is switched.

3. The imaging apparatus according to claim 1,
    wherein, said center position correction unit includes a shutter speed versus correction amount table in which the shutter speed is measured in advance and the amount of correction at the center position of the shading correction with respect to an arbitrary shutter speed is computed and stored.

4. The imaging apparatus according to claim 3,
    wherein, said shutter speed versus correction amount table is provided for each zoom position where the position of the zoom lens of said optical system is switched.

5. The imaging apparatus according to claim 2,
    wherein, said center position correction unit includes a zoom position versus correction amount table in which the zoom position is measured in advance and the amount of correction at the center position of the shading correction with respect to an arbitrary zoom position is computed and stored.

6. The imaging apparatus according to claim 5,
    wherein, said zoom position versus correction amount table is provided for each said shutter speed.

7. An imaging method of performing shading correction not to decrease the amount of light of the outer edge in an image picked up through an optical system, comprising the steps of:
    executing computation to make a center position of said shading correction change at the time of autofocus of said optical system in accordance with the shutter speed of a shutter which switches the exposure timing of said imaging; and
    correcting a center position of an image at the time of capturing said image based on the amount of correction obtained by said computation.

8. The imaging method according to claim 7, further comprising the step of:
    executing the computation to make a center position of said shading correction change at the time of autofocus of said optical system in accordance with the zoom position where the position of a zoom lens of said optical system is switched.

9. The imaging method according to claim 7,
    wherein the computation to make a center position of said shading correction change is executed by using a shutter speed versus correction amount table in which the shutter speed is measured in advance and the amount of correction at the center position of the shading correction with respect to an arbitrary shutter speed is computed and stored.

10. The imaging method according to claim 9,
    wherein the computation executed by using said shutter speed versus correction amount table is executed at each zoom position where the position of the zoom lens of said optical system is switched.

11. The imaging method according to claim 8,
    wherein the computation to make a center position of said shading correction change is executed by using a zoom position versus correction amount table in which the zoom position is measured in advance and the amount of correction at the center position of the shading correction with respect to an arbitrary zoom position is computed and stored.

12. The imaging method according to claim 11,
    wherein the computation executed by using said zoom position versus correction amount table is executed at each said shutter-speed.

* * * * *